US012662198B2

(12) United States Patent
Yoshida et al.

(10) Patent No.: US 12,662,198 B2
(45) Date of Patent: Jun. 23, 2026

(54) VEHICLE BODY REAR STRUCTURE

(71) Applicant: HONDA MOTOR CO., LTD., Tokyo (JP)

(72) Inventors: Masayasu Yoshida, Wako (JP); Satoru Kawabe, Wako (JP); Hiroyo Miyanaga, Wako (JP); Yasunori Watanabe, Wako (JP); Hisashi Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 300 days.

(21) Appl. No.: 18/218,606

(22) Filed: Jul. 6, 2023

(65) Prior Publication Data

US 2024/0043069 A1 Feb. 8, 2024

(30) Foreign Application Priority Data

Aug. 5, 2022 (JP) ................................. 2022-125424

(51) Int. Cl.
B62D 25/20 (2006.01)
B62D 21/15 (2006.01)

(52) U.S. Cl.
CPC ......... B62D 25/2027 (2013.01); B62D 21/15 (2013.01)

(58) Field of Classification Search
CPC .................................................... B62D 43/10
USPC .......... 296/187.11, 193.08, 203.04; 293/132, 293/133
See application file for complete search history.

(56) References Cited

U.S. PATENT DOCUMENTS 3,595,335 A * 7/1971 Wessells, III ........ B62D 25/087
180/274
5,346,275 A * 9/1994 Enning ................ B62D 29/008
296/76

(Continued)

FOREIGN PATENT DOCUMENTS

CN 109421818 3/2019
CN 112590690 4/2021

(Continued)

OTHER PUBLICATIONS

Translation of DE 102011002405 (Year: 2011).*

(Continued)

*Primary Examiner* — Amy R Weisberg
*Assistant Examiner* — Veronica M Condo
(74) *Attorney, Agent, or Firm* — Amin, Turocy & Watson, LLP

(57) ABSTRACT

A vehicle body rear structure has a rear floor panel, a rear panel, a rear bumper beam and a plurality of floor reinforcement portions. The rear bumper beam extends along a vehicle width direction in a central region in the vehicle width direction at a rear portion of the rear panel and has a length in the vehicle width direction shorter than a length of the rear floor panel and a length of the rear panel. Each of the plurality of floor reinforcement portions extends substantially along a vehicle front rear direction and reinforces a plurality of locations of the rear floor panel spaced apart in the vehicle width direction. Rear end portions of the floor reinforcement portions are disposed inner side of the rear bumper beam in the vehicle width direction than outer end portions of the rear bumper beam in the vehicle width direction.

3 Claims, 7 Drawing Sheets

(56) References Cited

U.S. PATENT DOCUMENTS

| | | | | |
|---|---|---|---|---|
| 7,905,541 B2 * | 3/2011 | Yamaguchi | .......... | B62D 25/087 |
| | | | | 296/203.04 |
| 8,118,341 B2 * | 2/2012 | Taneda | .................. | B62D 43/10 |
| | | | | 296/187.11 |
| 8,480,165 B2 * | 7/2013 | Koyama | ............ | B62D 25/2027 |
| | | | | 296/203.04 |
| 8,544,940 B2 * | 10/2013 | Kowalski | ............... | B62D 33/02 |
| | | | | 296/193.07 |
| 8,585,132 B2 * | 11/2013 | Klimek | ................ | B62D 25/082 |
| | | | | 296/193.07 |
| 9,033,406 B2 * | 5/2015 | Tokumoto | ............ | B62D 25/087 |
| | | | | 296/193.08 |
| 9,956,860 B2 * | 5/2018 | Tsuji | ......................... | B60R 5/04 |
| 10,399,604 B2 * | 9/2019 | Shigeta | ................. | B62D 25/08 |
| 10,407,098 B2 * | 9/2019 | Berman | ............ | B62D 25/2027 |
| 10,688,948 B2 * | 6/2020 | Campbell | ............... | B60R 19/34 |
| 11,027,780 B2 * | 6/2021 | Ayukawa | ............. | B62D 25/082 |
| 11,130,526 B2 * | 9/2021 | Morimoto | ............ | B62D 21/155 |
| 11,135,986 B2 * | 10/2021 | Hasegawa | ............... | B60R 19/18 |
| 11,220,292 B2 * | 1/2022 | Watanabe | ............... | B62D 27/02 |
| 11,679,813 B2 * | 6/2023 | Watanabe | .......... | B62D 25/2027 |
| | | | | 296/204 |
| 11,834,099 B2 * | 12/2023 | Watanabe | ............... | B62D 29/00 |
| 12,325,468 B2 * | 6/2025 | Gim | .................. | B62D 25/2027 |
| 2009/0033120 A1 * | 2/2009 | Sakai | ...................... | B60R 5/044 |
| | | | | 296/37.16 |
| 2009/0085380 A1 | 4/2009 | Sakamoto et al. | | |
| 2011/0227367 A1 * | 9/2011 | Funakoshi | ............. | B62D 43/10 |
| | | | | 296/187.11 |
| 2019/0061507 A1 | 2/2019 | Nitta et al. | | |
| 2020/0406734 A1 * | 12/2020 | Choi | ......................... | B60K 1/04 |

FOREIGN PATENT DOCUMENTS

| | | | | | |
|---|---|---|---|---|---|
| DE | 102011002405 A1 * | 7/2011 | .......... | B62D 25/087 |
| JP | 2004-106808 | 4/2004 | | |
| JP | 2007-083840 | 4/2007 | | |
| JP | 2012-025337 | 2/2012 | | |
| JP | 2015-128982 | 7/2015 | | |
| JP | 2016-078658 | 5/2016 | | |
| JP | 2019137352 A * | 8/2019 | ............ | B62D 21/15 |
| JP | 2022-043911 | 3/2022 | | |
| WO | WO-2012086297 A1 * | 6/2012 | ............. | B60L 50/64 |
| WO | 2014/112265 | 7/2014 | | |
| WO | WO-2018153623 A1 * | 8/2018 | ......... | B62D 25/2027 |

OTHER PUBLICATIONS

Translation of JP 2019137352 (Year: 2019).*

Japanese Office Action for Japanese Patent Application No. 2022-125424 mailed Feb. 27, 2024.

Chinese Office Action for Chinese Patent Application No. 202310726350.5 mailed Apr. 20, 2026.

* cited by examiner

VEHICLE BODY REAR STRUCTURE

CROSS-REFERENCE TO RELATED APPLICATION

Priority is claimed on Japanese Patent Application No. 2022-125424, filed Aug. 5, 2022, the content of which is incorporated herein by reference.

BACKGROUND OF THE INVENTION

Field of Invention

The present invention relates to a vehicle body rear structure of an automobile.

Description of Related Art

In a rear of a vehicle body of an automobile, a pair of rear side frames extending substantially along a vehicle front rear direction are arranged on the side of the vehicle body, and a rear floor panel is erected on the left and right rear side frames. At a rear of the rear floor panel, a rear panel is arranged to stand upwardly, and a rear bumper beam extending along the vehicle width direction is arranged at a rear of the rear panel.

The rear bumper beam usually extends outward in the vehicle width direction longer than the rear floor panel and the rear panel. However, in recent years, due to vehicle design and other reasons, a structure at the rear of the vehicle body in which the rear bumper beam extends shorter than the rear floor panel or the rear panel in the vehicle width direction may be adopted (see, for example, JP-A2022-43911).

SUMMARY OF THE INVENTION

It is desired that the rear of the vehicle body of the automobile be able to sufficiently absorb the energy of an impact load by crushing and deforming the rear side frame and the rear floor panel when the impact load is input from the rear of the vehicle.

For this reason, it has been considered to enhance the energy absorption performance at the time of the impact load input by moderately reinforcing multiple locations of the rear floor panel separated in the vehicle width direction with floor reinforcement portions such as bulkheads (cross-sectional reinforcement members) and reinforcement beads.

However, in the above conventional vehicle body rear structure, if floor reinforcement portions such as bulkheads and reinforcement beads are located outside of the rear bumper beam in the vehicle width direction, there is a concern that the rear panel may rupture prematurely depending on the position of the impact load input to the rear of the vehicle. That is, if an impact load is input at a location outside the rear bumper beam of the rear of the vehicle in the vehicle width direction, the impact load may apply a local aligned load to the rear panel between the rear panel and a rear end portion of the floor reinforcement portion, and this aligned load may cause the rear panel to fracture. If the rear panel ruptures prematurely at the time of the impact load input, a wide range of crushing deformation (energy absorption) of the rear floor panel will be inhibited.

Aspects of the present invention have been made in view of the above circumstances, and it is an object of the present invention to provide a vehicle body rear structure capable of efficiently absorbing energy of an impact load by the rear panel and the rear floor panel by suppressing local rupture of the rear panel at the time of input of the impact load from the rear of the vehicle. Furthermore, it is an object of the present invention to enhance the collision safety of vehicles and to contribute to the development of sustainable transportation systems.

In order to solve the above-mentioned problems and achieve the above-mentioned purposes, the present invention adopts the following aspects.

(1) A vehicle body rear structure according to an aspect of the present invention includes: a rear floor panel disposed at a rear portion of a vehicle; a rear panel disposed to stand at a rear portion of the rear floor panel; a rear bumper beam extending along a vehicle width direction in a central region in the vehicle width direction at a rear portion of the rear panel and having a length in the vehicle width direction shorter than a length of the rear floor panel and a length of the rear panel; and a plurality of floor reinforcement portions each of which extends substantially along a vehicle front rear direction and reinforces a plurality of locations of the rear floor panel spaced apart in the vehicle width direction, wherein rear end portions of the floor reinforcement portions are disposed inner side of the rear bumper beam in the vehicle width direction than outer end portions of the rear bumper beam in the vehicle width direction.

In the above configuration, when an impact load is input to the rear bumper beam from the rear of the vehicle, the impact load is input to the rear floor panel and the floor reinforcement portion via the rear panel. At this time, the impact load input from the rear bumper beam to the rear panel deforms the rear panel and crushes the rear floor panel and the floor reinforcement portion, while energy is absorbed.

When an impact load is input from the rear of the vehicle to the outside of the rear bumper beam in the vehicle width direction, the impact load deforms the rear panel and crushes the outside area of the rear floor panel in the vehicle width direction, while energy is absorbed. At this time, since the impact load input portion of the rear panel is separated outward from the rear end portion of the floor reinforcement portion extending substantially along the vehicle front rear direction in the vehicle width direction, the rear panel is unlikely to be subjected to locally large aligned stresses. Therefore, the rear panel is deformed in a wide range without localized fracture, and the impact load is transmitted to the rear floor panel so that a wide range of the rear floor panel is smoothly crushed.

(2) In the above aspect (1), an outer floor reinforcement portion, which is disposed most outwardly in the vehicle width direction among the plurality of the floor reinforcement portions, may be inclined outwardly in the vehicle width direction from a rear end portion of the outer floor reinforcement portion toward a front side of the vehicle.

In this case, when an impact load is input from the rear of the vehicle to the outside of the rear bumper beam in the vehicle width direction, the rear floor panel is crushed as the rear panel is deformed. At this time, the input impact load is directed outward in the vehicle width direction along the inclination of the outer floor reinforcement portion. As a result, the damage to the vehicle caused by the impact load is reduced.

(3) In the above aspect (2), at least a rear portion area of the rear floor panel may be configured by a double panel structure having an upper panel and a lower panel, and the outer floor reinforcement portion may be configured by a cross-sectional reinforcement member that is coupled within a cross-section of the double panel structure.

In this case, when an impact load is input from the rear of the vehicle to the outside of the rear bumper beam in the vehicle width direction, the double panel structure is crushed along with the deformation of the rear panel to efficiently absorb the energy of the input impact load. At this time, since the upper and lower panels of the double panel structure are connected by the outer floor reinforcement portion, the double panel structure is smoothly crushed and deformed from the rear side while local folding is suppressed. Therefore, when this configuration is adopted, the energy of the impact load can be absorbed well at the time of impact load input.

(4) The above aspect (3) may further include: a left and right pair of rear side frames extending substantially along the vehicle front rear direction; and a rear cross member connecting rear portions of the left and right pair of rear side frames, wherein a member cross-sectional reinforcement member is connected within a cross-section of the rear cross member to reinforce the cross-section of the rear cross member, and wherein the member cross-sectional reinforcement member is disposed between a front end portion of the cross-sectional reinforcement member and the rear side frame so as to be aligned in a straight line with the cross-sectional reinforcement member of the double panel structure.

In this case, the impact load input to the cross-sectional reinforcement member (the outer floor reinforcement portion) through the rear panel is received by the rear side frame via the member cross-sectional reinforcement member in the rear cross member.

When an impact load is input to the rear bumper beam from the rear of the vehicle, the double panel structure and the sectional reinforcement member (the outer floor reinforcement portion) are crushed to some extent, and then the rear side frame is crushed and the energy of the impact load is sufficiently absorbed.

When an impact load is input from the rear of the vehicle to the outside of the rear bumper beam in the vehicle width direction, the inclination of the cross-sectional reinforcement member (the outer floor reinforcement portion), of which the front end portion side is rigidly supported by the rear side frame via the rear cross member, ensures that the impact load is directed to the outside of the vehicle width direction. Therefore, when this configuration is adopted, damage to the vehicle caused by the impact load is more suppressed.

(5) The above aspect (3) may further include a left and right pair of rear side frames extending along the vehicle front rear direction, wherein a front end portion of the outer floor reinforcement portion is butted against the rear side frames.

In this case, the impact load input to the cross-sectional reinforcement member (the outer floor reinforcement portion) through the rear panel is received by the highly rigid rear side frames.

When an impact load is input to the rear bumper beam from the rear of the vehicle, the double panel structure and the cross-sectional reinforcement member (outer floor reinforcement portion) are crushed to some extent, and then the rear side frame is crushed and the energy of the impact load is sufficiently absorbed.

When an impact load is input from the rear of the vehicle to the outside of the rear bumper beam in the vehicle width direction, the inclination of the cross-sectional reinforcement member (the outer floor reinforcement portion), of which the front end portion side is rigidly supported by the rear side frame, ensures that the impact load is directed to the outside of the vehicle width direction. Therefore, when this configuration is adopted, damage to the vehicle caused by the impact load is more suppressed.

In the present invention, the rear end portion of the floor reinforcement portion extending substantially along the vehicle front rear direction is disposed inner side of the rear bumper beam in the vehicle width direction than the outer end of the rear bumper beam in the vehicle width direction. As a result, when an impact load is input to the outside area of the rear bumper beam in the vehicle width direction, local stress is less likely to act between the impact load input portion of the rear panel and the rear end portion of the floor reinforcement portion. Therefore, when the present invention is adopted, the local rupture of the rear panel can be suppressed and the energy of the impact load can be efficiently absorbed by the rear panel and the rear floor panel.

DETAILED DESCRIPTION OF THE INVENTION

The following description of embodiments of the invention is based on the drawings. The drawings are marked at appropriate places with an arrow FR pointing toward the front of a vehicle, an arrow UP pointing toward the top of the vehicle, and an arrow LH pointing toward the left side of the vehicle. In each embodiment, the same symbol will be applied to common parts.

Figure 1:
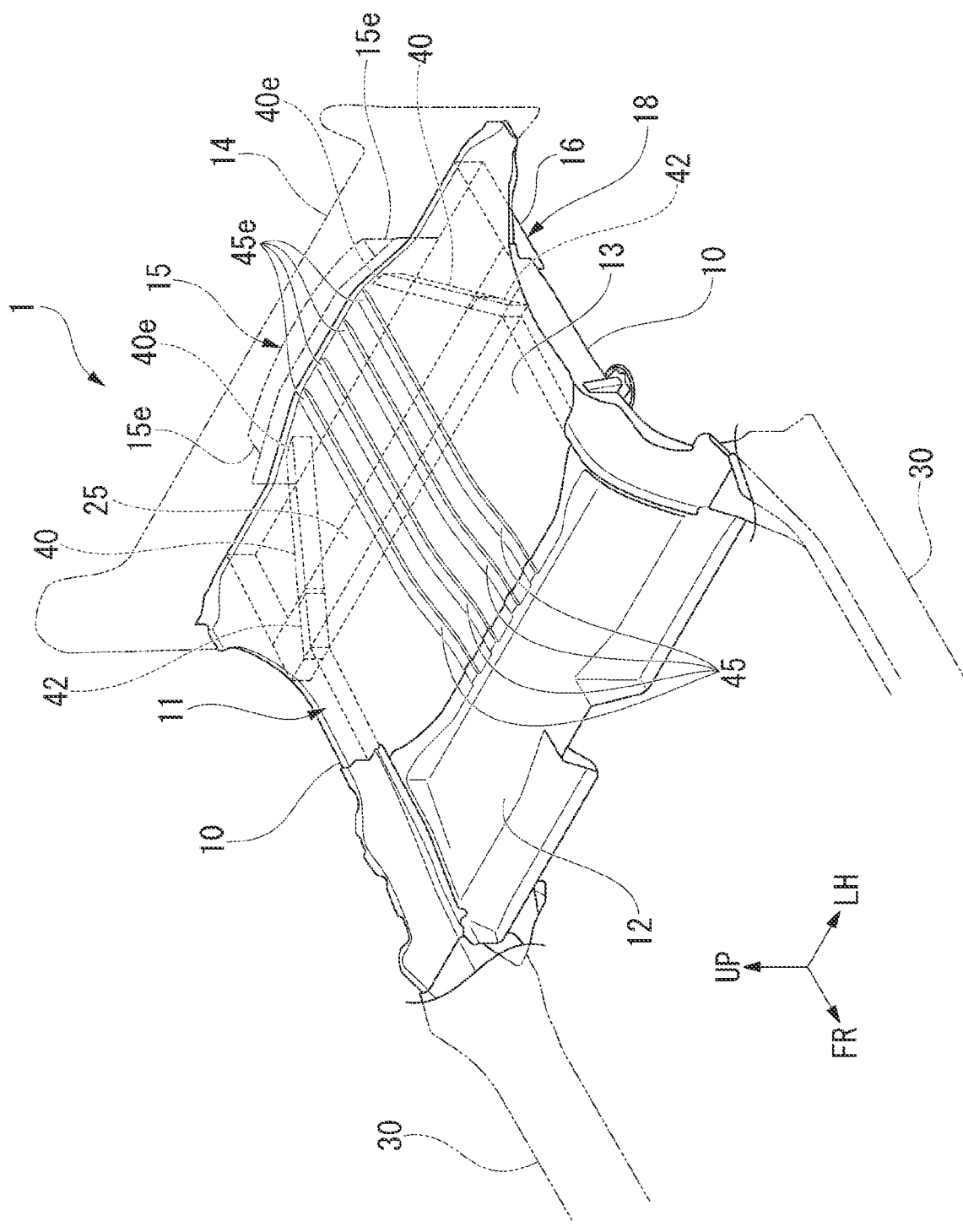
FIG. 1 is a perspective diagram of a rear of a vehicle body of an embodiment of the present invention, viewed from a front upper side.
Figure 2:
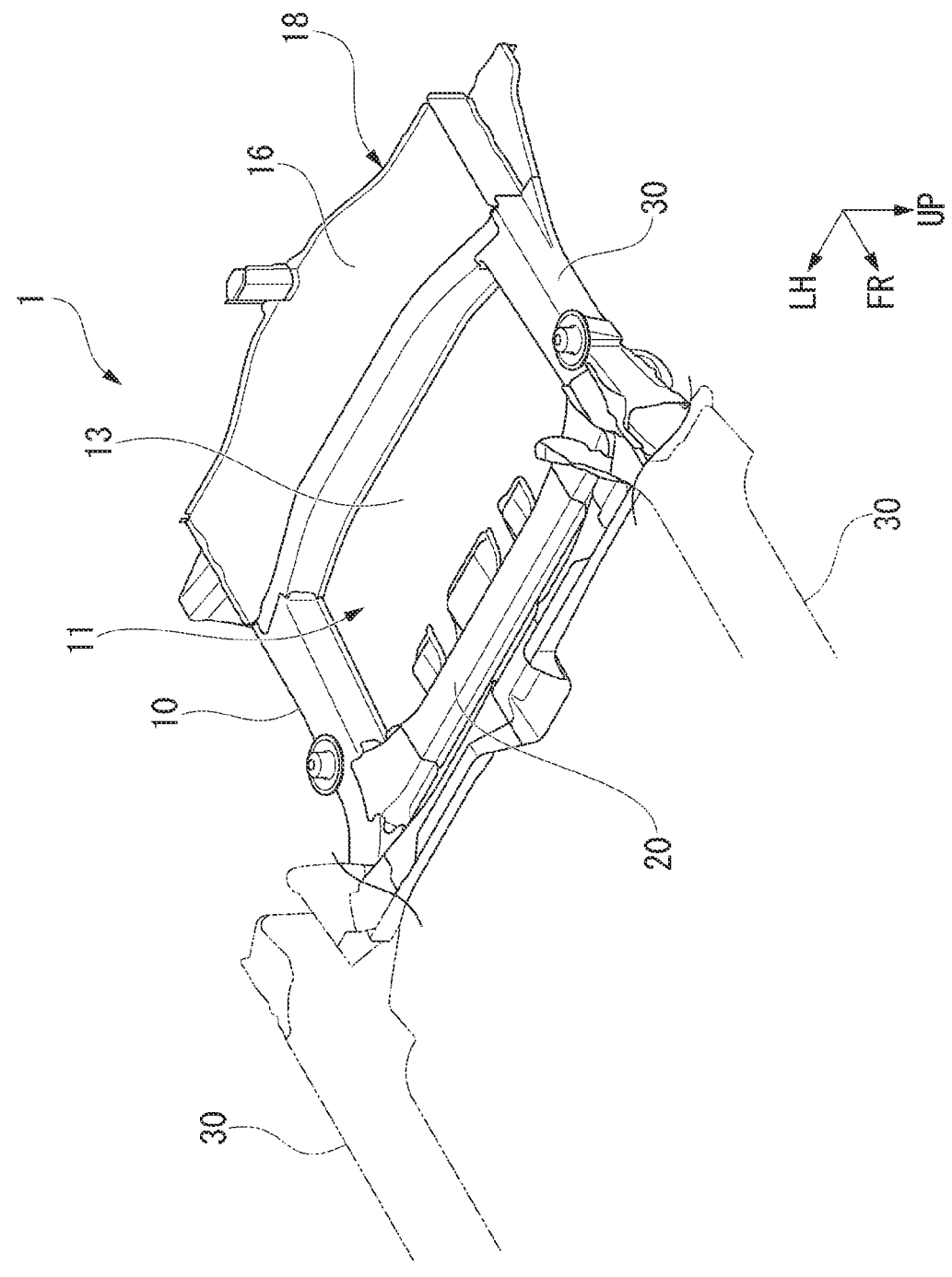
FIG. 2 is a perspective diagram of the rear of the vehicle body of the embodiment of the present invention, viewed from a front lower side.
Figure 3:
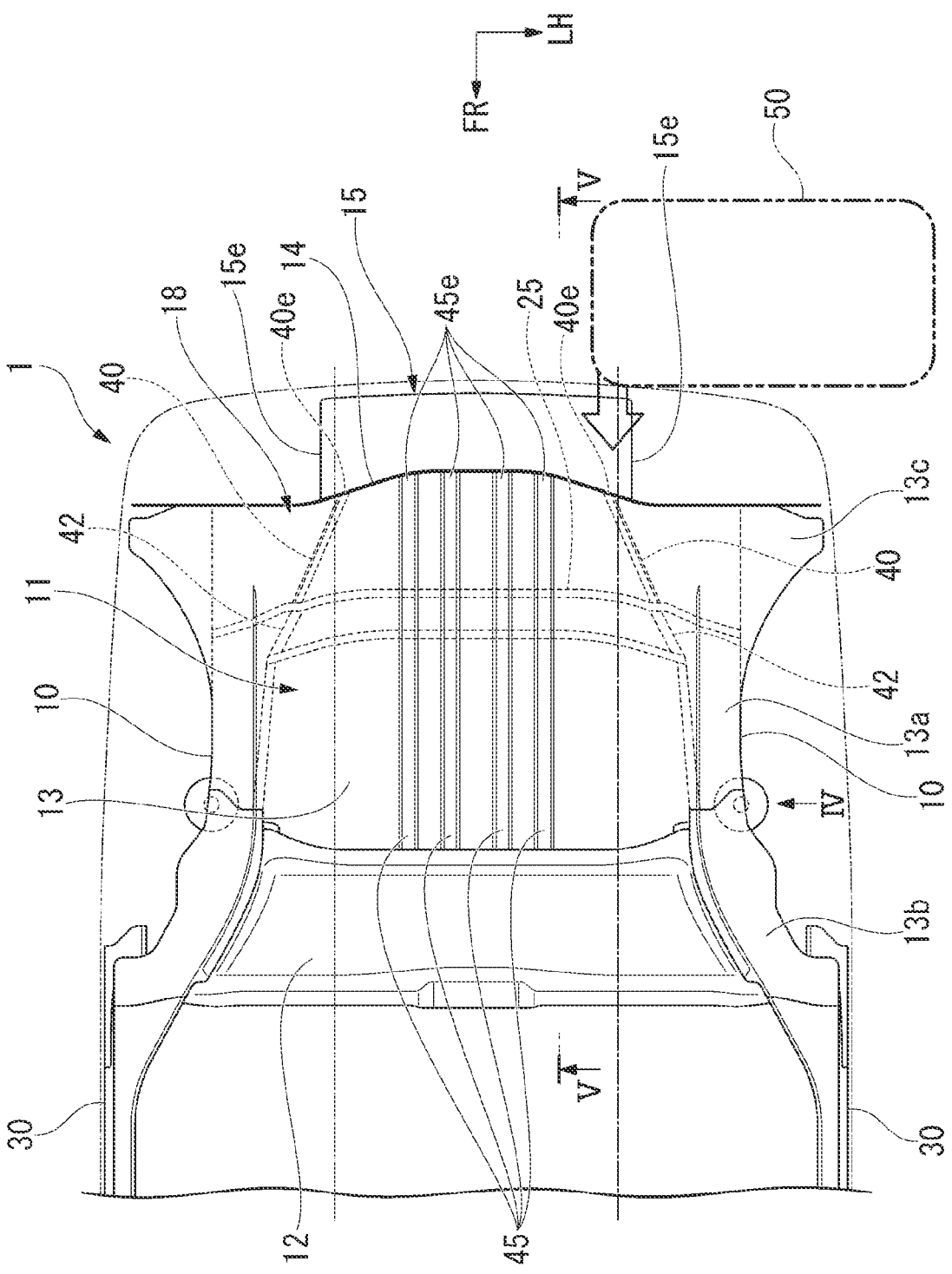
FIG. 3 is a plan view of the rear of the vehicle body of the embodiment of the present invention.
Figure 4:
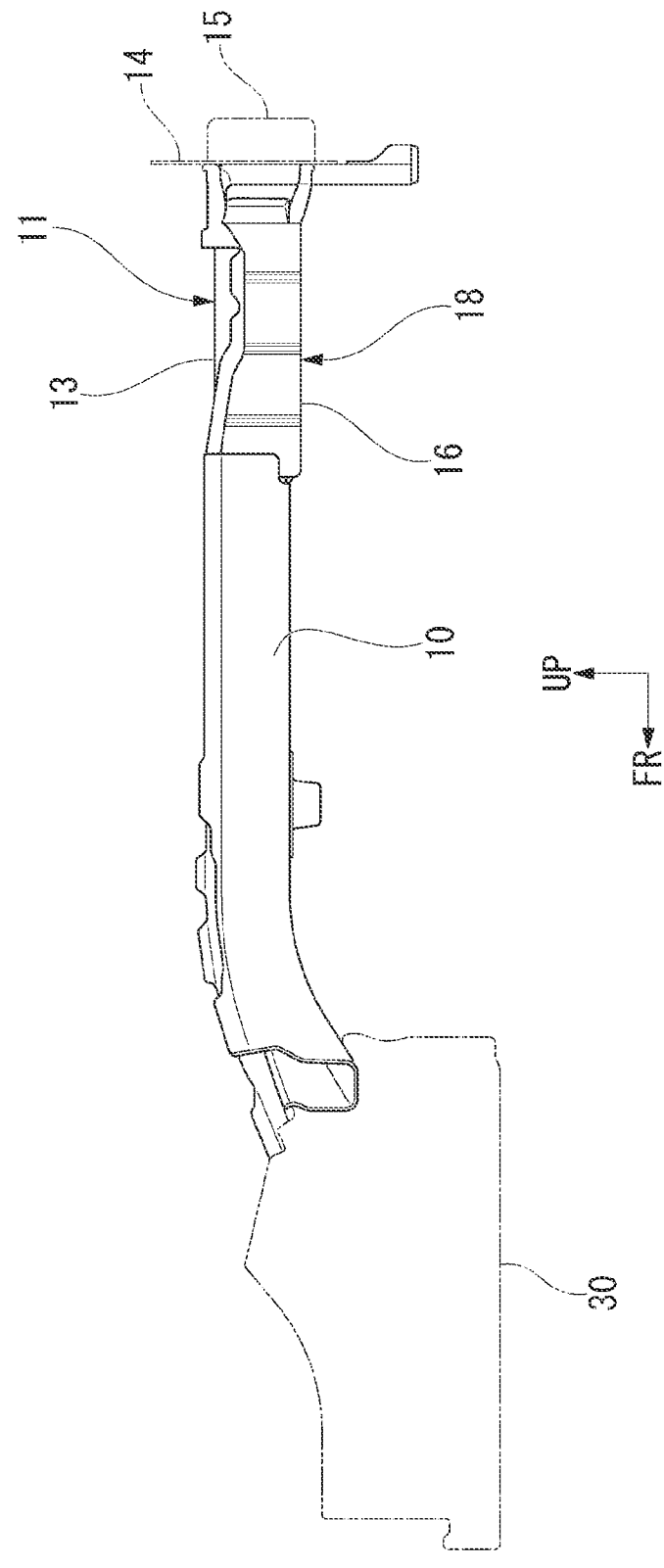
FIG. 4 is an IV arrow view of FIG. 3.
Figure 5:
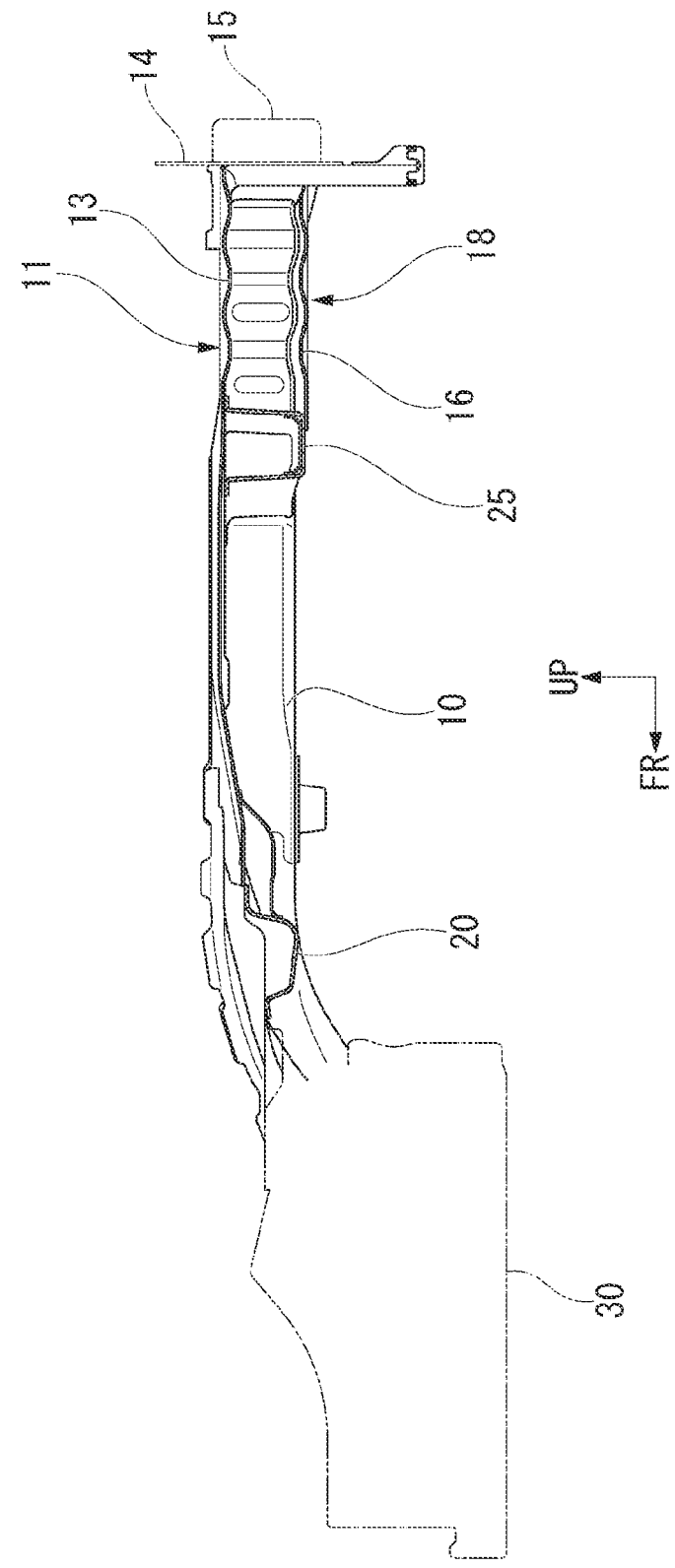
FIG. 5 is a cross-sectional view along a V-V line of FIG. 3.

FIG. 1 is a perspective diagram of a rear of a vehicle body of a vehicle 1 of an embodiment of the present invention, viewed from a front upper side, and FIG. 2 is a perspective diagram of the rear of the vehicle body of the vehicle 1, viewed from a front lower side. FIG. 3 is a plan view of the rear of the vehicle body of the vehicle 1. FIG. 4 is an IV arrow view of FIG. 3, and FIG. 5 is a cross-sectional view along a V-V line of FIG. 3.

A pair of rear side frames 10 extending substantially along a vehicle front rear direction are disposed on both the left and right sides of the rear portion area of the vehicle 1. Front end portions of each of left and right rear side frames 10 are coupled to left and right corresponding side sills 30 which are disposed below a side of a vehicle cabin. The left and right rear side frames 10 are interconnected by a front cross member 20 (see FIGS. 2 and 5) in a front end portion area (located behind a connection with the side sill 30), and rear end portions thereof are connected to each other by a rear cross member 25 (see FIGS. 3 and 5). A front portion area of the rear floor panel 11 is coupled to the left and right rear side frames 10 and the front cross member 20. A front floor panel (not shown) is connected to a forward side of the rear floor panel 11.

At a front end portion of the rear floor panel 11, a beam portion 12 (see FIG. 1) extending along the vehicle width direction is integrally formed. An upper part of the beam portion 12 is designed to support a rear seat (not shown). The beam portion 12 is formed by bending a front end portion of the upper panel 13 of the rear floor panel 11, which is described below, into a U-shaped cross section. A rear panel 14 at the rear of the vehicle body is coupled to a rear end portion of the rear floor panel 11. The rear panel 14 is a metal panel standing upward from the rear end portion of the rear floor panel 11, and a rear bumper beam 15 extending substantially along the vehicle width direction is coupled to a rear surface side of the rear panel 14.

The rear bumper beam 15 is disposed at a rear of the rear panel 14 in a central region of the vehicle width direction and is shorter in length in the vehicle width direction than the rear floor panel 11 and the rear panel 14. A rear side of the rear bumper beam 15 is covered by a bumper face (not shown) of the vehicle body.

The rear floor panel 11 has an upper panel 13 with the beam portion 12 described above at the front end portion and a lower panel 16 disposed below a rear portion area of the upper panel 13. The lower panel 16 has an upwardly standing front wall and left and right side walls, with the front wall and the left and right side walls joined to the rear portion area of the upper panel 13. The upper panel 13 and the lower panel 16 are formed by a metal plate made of, for example, an aluminum alloy. The upper panel 13 and the lower panel 16 configure a double panel structure 18 in the rear portion area of the rear floor panel 11. The cross section of the double panel structure 18 along the vehicle width direction is formed in a substantially horizontal rectangular shape. A front edge portion of the double panel structure 18 is joined to the rear cross member 25 connecting the rear end portions of the left and right rear side frames 10.

As shown in FIG. 3, the upper panel 13 has a narrower width portion 13a in the vehicle width direction, a front side widening portion 13b that is connected to a front side of the narrower width portion 13a and is wider in the vehicle width direction than the narrower width portion 13a, and a rear side widening portion 13c that is connected to a rear side of the narrower width portion 13a and is wider in the vehicle width direction than the narrower width portion 13a. Each of side edge portions of the front side widening portion 13b and the rear side widening portion 13c extends outward in the vehicle width direction from a side edge portion of the narrower width portion 13a. A side of the narrower width portion 13a is used as a rear wheel placement space. The lower panel 16 is joined across an underside of the rear side widening portion 13c and an underside of the narrower width portion 13a.

Here, each of the left and right rear side frames 10 extends from the rear end portion of the left and right corresponding side sill 30 on each side of the vehicle body toward the rear of the vehicle body, but rear end portions of the left and right rear side frames 10 do not reach a rear end portion of the vehicle body. Specifically, the left and right rear side frames 10 end up to a front portion area of the double panel structure 18 of the rear floor panel 11. In other words, the rear portion area of the rear floor panel 11 (the double panel structure 18) extends further rearward of the vehicle than the left and right rear side frames 10.

At the rear end portions of the lower panel 16 and the upper panel 13, which constitute the double panel structure 18, the rear panel 14 is coupled to the rear end portions so as to close a gap between the rear end portions. The double panel structure 18 is closed at the rear by the rear panel 14 to form a box structure. The rear bumper beam 15 is coupled to the rear end portions of the upper panel 13 and the lower panel 16 of the double panel structure 18 across the rear panel 14.

A pair of bulkheads 40, which are the cross-sectional reinforcement members, are disposed to be separated in the vehicle width direction inside the double panel structure 18 at the rear of the rear floor panel 11. Each bulkhead 40 is formed long in a front-rear direction, and each flange portion formed integrally at top and bottom is joined to a bottom surface of the upper panel 13 and a top surface of the lower panel 16. As shown in FIGS. 1 and 3, each bulkhead 40 has its rear end portion 40e disposed inner side of the rear bumper beam 15 in the vehicle width direction than an outer end portion 15e of the rear bumper beam 15 in the vehicle width direction. Each bulkhead 40 is inclined outwardly in the vehicle width direction from the rear end portion 40e toward the front side of the vehicle and is joined to the upper panel 13 and the lower panel 16 in that condition.

In this embodiment, the bulkhead 40 constitutes an outer floor reinforcement portion that is disposed most outwardly in the vehicle width direction.

A bulkhead 42 is disposed within the cross-section of the rear cross member 25. The bulkhead 42 is joined to the rear cross member 25 within the cross-section of the rear cross member 25. In this embodiment, the bulkhead 42 constitutes a member cross-sectional reinforcement member that reinforces the cross-section of the rear cross member 25.

The bulkhead 42 is positioned between the front end portion of the bulkhead 40 and the rear end portion of the corresponding rear side frame 10 on the left and right sides so as to be aligned in a straight line with the bulkhead 40 that is joined to the double panel structure 18. Therefore, when a load is input to the bulkhead 40 of the double panel structure 18 from the rear of the vehicle via the rear bumper beam 15, the load is transferred to the rear end portion of the corresponding rear side frame 10 on the left and right sides through the bulkhead 42 in the rear cross member 25.

In a center region of the upper panel 13 of the rear floor panel 11 in the vehicle width direction, a plurality (four) of reinforcement beads 45 extending along the vehicle front rear direction body are formed. A rear end portion 45e of each reinforcement bead 45 extends to a position where it reaches the rear end portion of the upper panel 13. The rear end portion 45e of each reinforcement bead 45 is disposed at a location that is inside the rear bumper beam 15 in the vehicle width direction than the outer end portion 15e of the rear bumper beam 15 in the vehicle width direction, and inside the bulkhead 40 in the vehicle width direction.

Figure 6:
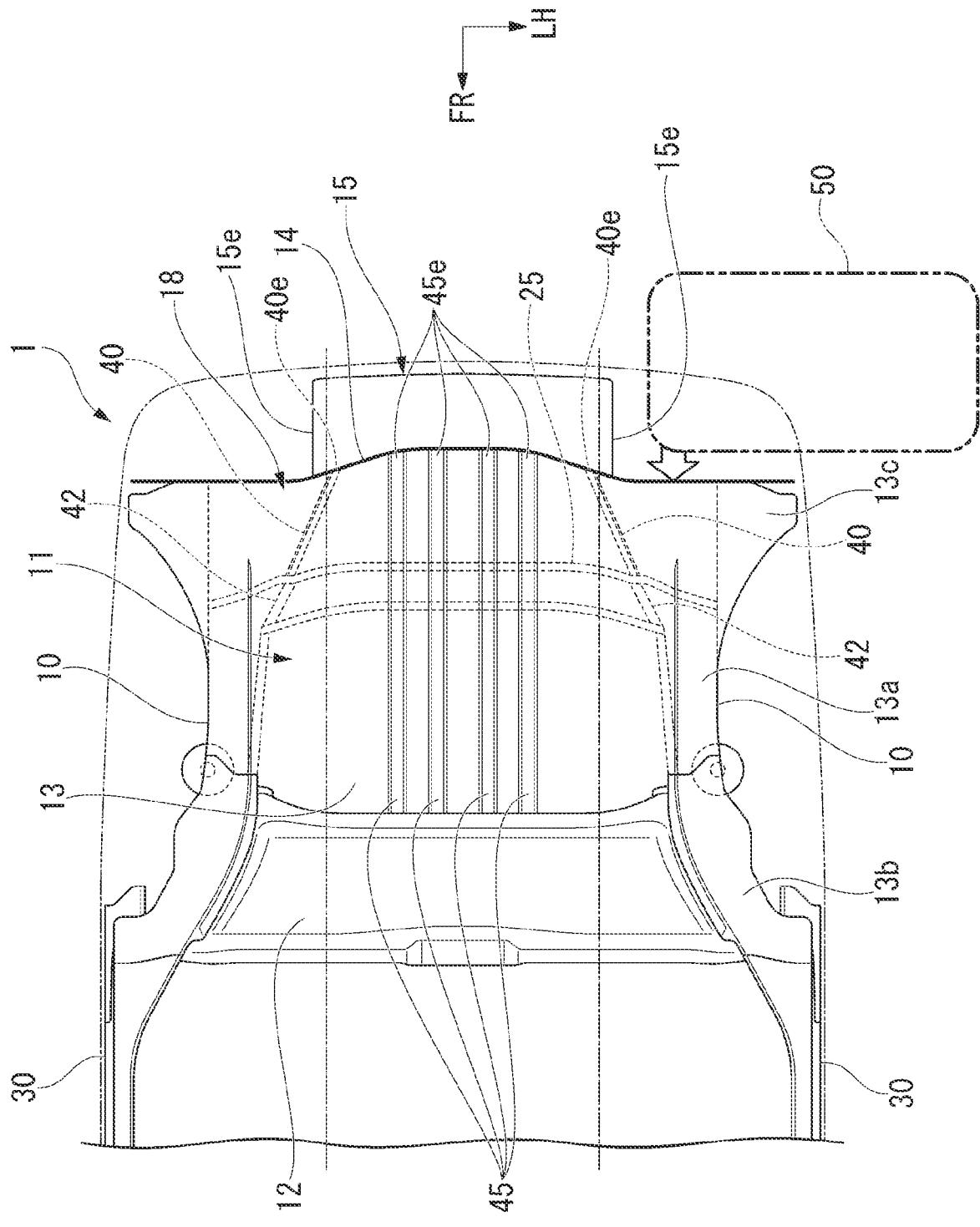
FIG. 6 is a plan view of the rear of the vehicle body of the embodiment of the present invention.

FIG. 6 is a plan view of the rear of the vehicle body similar to FIG. 3.

FIG. 3 shows a condition when an impact load is input from an object 50 behind the vehicle to the rear bumper beam 15, and FIG. 6 shows a condition when an impact load is input from the object 50 behind the vehicle to a position outside the rear bumper beam 15 in the vehicle width direction.

As shown in FIG. 3, when the impact load is input to the rear bumper beam 15 from the object 50 behind the vehicle, the impact load is input to the rear floor panel 11 and the bulkheads 40, 42 via the rear panel 14. At this time, the impact load input from the rear bumper beam 15 to the rear panel 14 deforms the rear panel 14 and crushes the rear floor panel 11 and the bulkheads 40, 42, while energy is absorbed.

As shown in FIG. 6, when the impact load is input from the object 50 behind the vehicle to the outside of the rear bumper beam 15 in the vehicle width direction, the impact load deforms the rear panel 14 and crushes the outside area of the rear of the rear floor panel 11 (the double panel structure 18) in the vehicle width direction, while energy is absorbed. At this time, the impact load input portion of the rear panel 14 is at a position spaced outward in the vehicle width direction relative to the rear end portion 40e of the bulkhead 40, which is the outer floor reinforcement portion. As a result, the rear panel 14 is unlikely to be subjected to locally large aligned stresses. Therefore, the rear panel 14 is deformed in a wide range without localized fracture, and the impact load is transmitted to the rear floor panel 11 so that a wide range of the rear floor panel 11 is smoothly crushed.

As described above, in the vehicle body rear structure of this embodiment, the rear end portions 40e and 45e of the bulkhead 40 and the reinforcement bead 45 (the floor reinforcement portion), which extend substantially along the vehicle front rear direction, are disposed inner side of the rear bumper beam 15 in the vehicle width direction than the outer end portions 15e of the rear bumper beam 15 in the vehicle width direction. Therefore, as shown in FIG. 6, when an impact load is input from the object 50 behind the vehicle in the outside area of the rear bumper beam 15 in the vehicle width direction, local stress is less likely to act between the impact load input portion of the rear panel 14 and the rear end portions 40e, 45e of the bulkhead 40 and reinforcement bead 45. Therefore, when the vehicle body rear structure of this embodiment is adopted, the local rupture of the rear panel 14 can be suppressed and the energy of the impact load can be efficiently absorbed by the rear panel 14 and rear floor panel 11.

Therefore, by adopting this form of vehicle body rear structure, it is possible to enhance the collision safety of the vehicle 1 and to contribute to the development of sustainable transportation systems.

In the vehicle body rear structure of this embodiment, the bulkheads 40, 42, which are the floor reinforcement portions disposed most outwardly in the vehicle width direction, are inclined outwardly in the vehicle width direction from the rear end portion 40e toward the front side of the vehicle. Therefore, when an impact load is input from the object 50 behind the vehicle to the outside of the rear bumper beam in the vehicle width direction, the rear of the rear floor panel 11 is crushed as the rear panel 14 is deformed. At this time, the input impact load is directed outward in the vehicle width direction along the inclinations of the bulkheads 40 and 42 (the outer floor reinforcement portions).

Therefore, when this configuration is adopted, the impact load input is parried by the inclined portions of the bulkhead 40, and the damage to the vehicle 1 caused by the impact load is reduced.

In the vehicle body rear structure of this embodiment, the rear portion area of the rear floor panel 11 is configured by the double panel structure 18 having the upper panel 13 and the lower panel 16, and the bulkhead 40 (the cross-sectional reinforcement member), which is the outer floor reinforcement portion, is coupled within the cross-section of the double panel structure 18. Therefore, when an impact load is input from an object 50 behind the vehicle to the outside of the rear bumper beam 15 in the vehicle width direction, the double panel structure 18 is crushed along with the deformation of the rear panel 14 to efficiently absorb the energy of the input impact load. At this time, since the upper panel 13 and lower panel 16 of the double panel structure 18 are connected by the bulkhead 40, the double panel structure is smoothly crushed and deformed from the rear side while local folding deformation is suppressed. Therefore, when this configuration is adopted, the energy of the impact load can be absorbed well at the time of impact load input.

Furthermore, in the vehicle body rear structure of this embodiment, the bulkhead 42 (the member cross-sectional reinforcement member) is connected within the cross-section of the rear cross member 25 connecting the rear portions of the left and right rear side frames 10, and the bulkhead 42 is disposed between the front end portion of the bulkhead 40 and the rear side frame 10 so as to be aligned in a straight line with the bulkhead 40 inside the double panel structure. This allows the impact load input to the bulkhead 40 through the rear panel 14 to be received by the highly rigid rear side frame 10 via the bulkhead 42 inside the rear cross member 25.

When an impact load is input to the rear bumper beam 15 from the rear of the vehicle, the double panel structure 18 and the bulkheads 40, 42 are crushed to some extent, and then the rear side frame 10 is crushed and the energy of the impact load can be efficiently absorbed.

When an impact load is input from the rear of the vehicle to the outside of the rear bumper beam in the vehicle width direction, the inclination of the bulkheads 40, 42, of which the front end portion side is rigidly supported by the rear side frame 10 via the rear cross member 25, ensures that the impact load is directed to the outside of the vehicle width direction. Therefore, when this configuration is adopted, damage to the vehicle 1 by the impact load is more suppressed.

Other Embodiments

Figure 7:
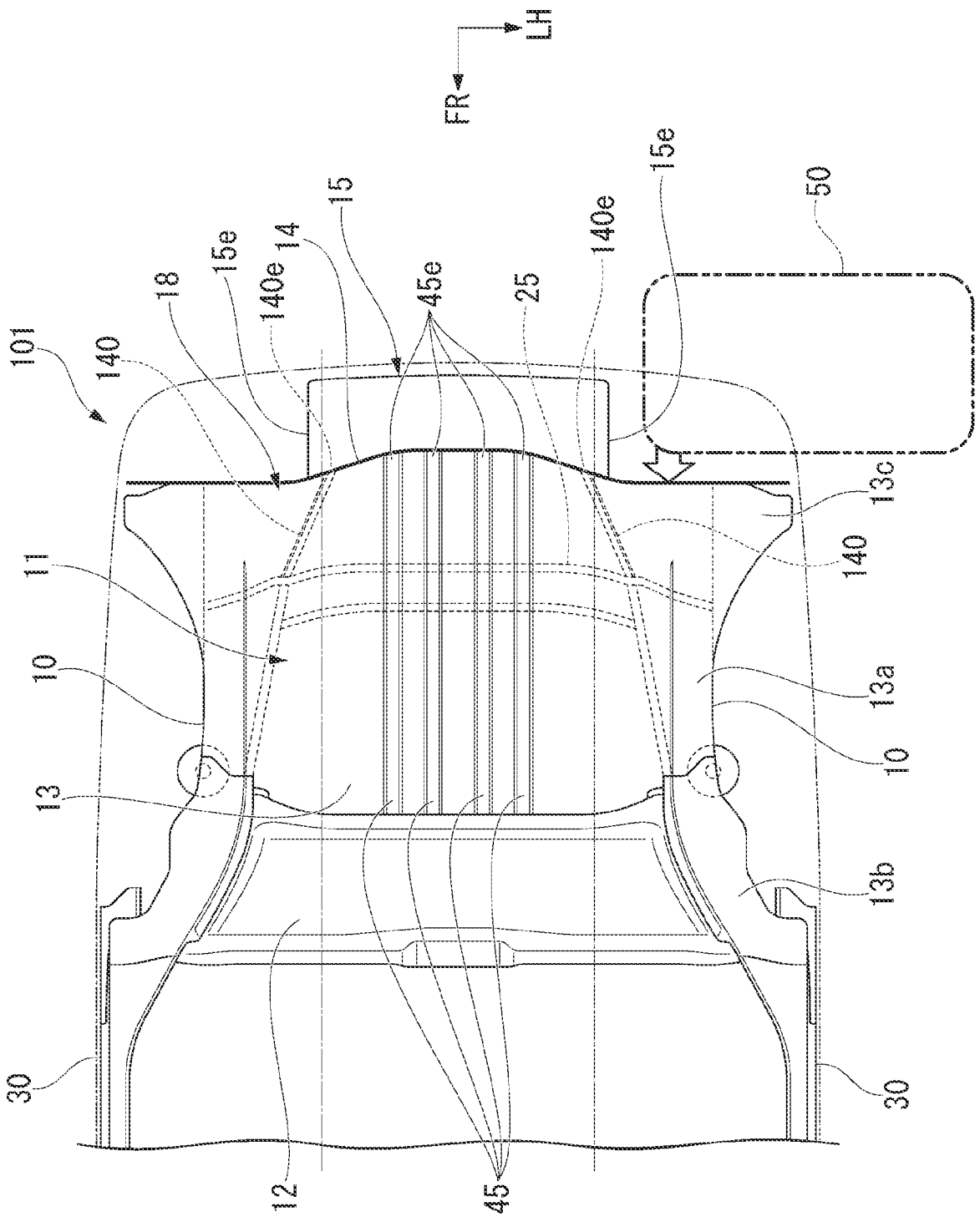
FIG. 7 is a plan view of a rear of a vehicle body of another embodiment of the present invention.

FIG. 7 is a plan view of a rear of a vehicle body of another embodiment.

A basic structure of a vehicle body rear structure of a vehicle 101 of this embodiment is almost the same as the above embodiment, but a reinforcement structure inside the double panel structure 18 at the rear of the rear floor panel 11 is slightly different from the above embodiment.

That is, in the above embodiment, the bulkhead 42 is also located inside the rear cross member 25, but in the vehicle body rear structure of this embodiment, a pair of bulkheads 140 is located only inside the double panel structure 18. A rear end portion 140e of each bulkhead 140 is disposed inner side of the rear bumper beam 15 in the vehicle width direction than the outer end portion 15e of the rear bumper beam 15 in the vehicle width direction. Each bulkhead 140 is inclined outwardly in the vehicle width direction from the rear end portion 140e toward the front, and a front end portion is butted against the rear end portions of the corresponding rear side frames 10 on the left and right sides.

Since the basic structure of the vehicle body rear structure of this embodiment is the same as the above embodiment, almost the same basic effect as the above embodiment can be obtained.

In the vehicle body rear structure of this embodiment, since the front end portion of the bulkhead 140 disposed inside the double panel structure 18 is butted against the rear end portions of the corresponding rear side frames 10 on the left and right sides, the impact load input to the bulkhead 140 through the rear panel 14 can be efficiently received by the highly rigid rear side frames 10.

When an impact load is input to the rear bumper beam 15 from the rear of the vehicle, the double panel structure 18 and the bulkhead 140 are crushed to some extent, and then the rear side frame 10 is crushed and the energy of the impact load can be efficiently absorbed.

Furthermore, when an impact load is input from the rear of the vehicle to the outside of the rear bumper beam 15 in the vehicle width direction, the impact load can be efficiently parried by the inclination of the bulkhead 140 of which the front end portion side is rigidly supported by the rear side frame 10. Therefore, when this configuration is adopted, damage to the vehicle 101 caused by the impact load can be more suppressed.

In particular, unlike the above embodiment, the vehicle body rear structure of this embodiment does not need to align the position and orientation of the bulkhead 40 inside the double panel structure 18 and the bulkhead 42 inside the rear cross member 25. Therefore, the number of parts can be reduced and the assembly can be simplified compared to the above embodiment.

The present invention is not limited to the above embodiments, and various design changes are possible without departing from the concept thereof.

For example, in the above embodiment, only the rear portion area of the rear floor panel is configured by the double panel structure, but the entire rear floor panel including a front portion area may be configured by the double panel structure.

What is claimed is:

1. A vehicle body rear structure, comprising:
   a rear floor panel disposed at a rear portion of a vehicle;
   a rear panel disposed to stand at a rear portion of the rear floor panel;
   a rear bumper beam extending along a vehicle width direction in a central region in the vehicle width direction at a rear portion of the rear panel and having a length in the vehicle width direction shorter than a length of the rear floor panel and a length of the rear panel; and
   a plurality of floor reinforcement portions each of which extends substantially along a vehicle front rear direction and reinforces a plurality of locations of the rear floor panel spaced apart in the vehicle width direction, wherein rear end portions of the floor reinforcement portions are disposed inner side of the rear bumper beam in the vehicle width direction than outer end portions of the rear bumper beam in the vehicle width direction,
   wherein an outer floor reinforcement portion, which is disposed most outwardly in the vehicle width direction among the plurality of the floor reinforcement portions, is inclined outwardly in the vehicle width direction from a rear end portion of the outer floor reinforcement portion toward a front side of the vehicle,
   wherein at least a rear portion area of the rear floor panel comprises a double panel structure having an upper panel and a lower panel, and
   wherein the outer floor reinforcement portion comprises a cross-sectional reinforcement member that is coupled to the upper panel and the lower panel within a cross-section of the double panel structure.

2. The vehicle body rear structure according to claim 1, further comprising:
   a left and right pair of rear side frames extending substantially along the vehicle front rear direction; and
   a rear cross member connecting rear portions of the left and right pair of rear side frames,
   wherein a member cross-sectional reinforcement member is connected within a cross-section of the rear cross member to reinforce the cross-section of the rear cross member, and
   wherein the member cross-sectional reinforcement member is disposed between a front end portion of the cross-sectional reinforcement member and the rear side frame so as to be aligned in a straight line with the cross-sectional reinforcement member of the double panel structure.

3. The vehicle body rear structure according to claim 1, further comprising a left and right pair of rear side frames extending along the vehicle front rear direction,
   wherein a front end portion of the outer floor reinforcement portion is butted against the rear side frames.

* * * * *